(12) United States Patent
Henly

(10) Patent No.: US 6,270,539 B1
(45) Date of Patent: Aug. 7, 2001

(54) MANNICH DISPERSANTS WITH ENHANCED LUBRICITY

(75) Inventor: Timothy J. Henly, Maidens, VA (US)

(73) Assignee: Ethyl Corporation, Richmond, VA (US)

( * ) Notice: Subject to any disclaimer, the term of this patent is extended or adjusted under 35 U.S.C. 154(b) by 0 days.

(21) Appl. No.: 09/386,690

(22) Filed: Aug. 31, 1999

(51) Int. Cl.$^7$ .................................................. C10L 1/18
(52) U.S. Cl. ................... 44/415; 508/54; 508/2; 564/367
(58) Field of Search ............... 44/415; 508/542; 564/367

(56) References Cited

U.S. PATENT DOCUMENTS

| | | | |
|---|---|---|---|
| 3,649,229 | * | 3/1972 | Otto .......................................... 44/73 |
| 3,877,889 | * | 4/1975 | Dix ........................................... 44/73 |
| 4,071,327 | * | 1/1978 | Dorer, Jr. ................................. 44/66 |
| 4,186,102 | * | 1/1980 | Malec ................................... 252/51.5 |
| 4,231,759 | * | 11/1980 | Udelhofen et al. ....................... 44/75 |
| 4,454,059 | * | 6/1984 | Pindar ................................... 508/542 |
| 4,487,852 | | 12/1984 | Brennan et al. . |
| 4,599,371 | | 7/1986 | Loch et al. . |
| 4,787,996 | * | 11/1988 | Horodysky et al. ................. 252/51.5 |
| 5,634,951 | * | 6/1997 | Colucci et al. ......................... 44/415 |
| 5,697,988 | * | 12/1997 | Malfer et al. .......................... 44/415 |
| 5,725,612 | * | 3/1998 | Malfer et al. .......................... 44/415 |
| 5,876,468 | * | 3/1999 | Moreton ................................ 44/415 |

FOREIGN PATENT DOCUMENTS

| | | |
|---|---|---|
| 0182940 | 6/1986 | (EP) . |
| 0410577 | 1/1991 | (EP) . |
| 0744458 | 11/1996 | (EP) . |
| 0807676 | 11/1997 | (EP) . |
| 2010324 | 6/1979 | (GB) . |

OTHER PUBLICATIONS

Patent Abstracts of Japan; vol. 1999, No. 02, Feb. 26, 1999 & JP 10 298258 (Asahi Organic Chem. Ind. Co. Ltd.), Nov. 10, 1998 –abstract.

* cited by examiner

*Primary Examiner*—Margaret Medley
*Assistant Examiner*—Cephia D. Toomer
(74) *Attorney, Agent, or Firm*—Thomas Hamilton; James T. Moore

(57) ABSTRACT

Reaction products of i) a compound containing at least one primary or secondary amine group and at least one hydroxyl group; ii) a polyamine containing at least two amine groups wherein at least one of the amine groups is a primary or secondary amine, and wherein component ii) is different from i); iii) an alkyl-substituted hydroxyaromatic compound, and iv) an aldehyde, provide improved detergency as well as improved lubricity to hydrocarbon fuels. Compositions comprising a hydrocarbon fuel and the reaction products are also disclosed.

29 Claims, No Drawings

MANNICH DISPERSANTS WITH ENHANCED LUBRICITY

TECHNICAL FIELD

The present invention relates to fuel compositions comprising a dispersant additive for hydrocarbon fuels, such as gasoline and diesel fuel, wherein said dispersant additive is the reaction product of i) a compound containing at least one primary or secondary amine group and at least one hydroxyl group; ii) a polyamine containing at least two amine groups wherein at least one of the amine groups is a primary or secondary amine, and wherein component ii) is different from i); iii) an alkyl-substituted hydroxyaromatic compound; and iv) an aldehyde.

BACKGROUND OF THE INVENTION

It has long been desired to maximize fuel economy and power in diesel engines while enhancing acceleration and preventing knocking and hesitation. Diesel fuel must ignite spontaneously and quickly (within 1 to 2 milliseconds) without a spark. The time lag between the initiation of injection and the initiation of combustion is called ignition delay. In high-speed diesel engines, a fuel with a long ignition delay tends to produce rough operation and knocking.

Two major factors affect ignition delay: the mechanical conditions in the engine and the chemistry of the fuel. The mechanical component is influenced by such factors as compression ratio, motion of the air charge during ignition and ability of the fuel injector to atomize fuel. The chemical component of ignition delay is influenced by such factors as the fuel's autoignition temperature, specific heat, density, viscosity, and other properties. The ability of a diesel fuel to ignite quickly after injection into a cylinder is known as its cetane number.

To minimize ignition delay in a diesel engine, it is desirable to enhance the mechanical component by maintaining the fuel injector's ability to precisely atomize fuel by keeping the injectors clean. However, this must be done in such a way that does not negatively affect the chemical component.

It would be beneficial to provide dispersant compositions that are highly effective in minimizing injector deposits in diesel engines, as well as intake valve deposits in gasoline engines, and that provide such an advantage without harm to the engine and without deterioration in engine performance.

Accordingly, one of the objects of the present invention is to provide a diesel fuel that provides effective detergency without attendant deterioration in engine performance.

Problems associated with fuel lubricity arose in the mid-1960's when a number of aviation fuel pump failures occurred. After considerable research, it was realized that advances in the refining of aviation turbine fuel had resulted in the almost complete removal of the naturally occurring lubricating components from the fuel. The removal of these natural lubricants resulted in the seizure of fuel pump parts. By the mid-1980's, it seemed likely that a similar problem was imminent in diesel fuel pumps. Fuel injection pump pressures had been steadily increasing while there was also a growing concern to reduce the sulfur content of the diesel fuel. The desire to reduce the sulfur content of the diesel fuel, in an effort to reduce pollution, required the use of more rigorous fuel refining processes. It was determined that as refining processes became more stringent, the naturally occurring sulfur, nitrogen and oxygen containing compounds and polyaromatics which contribute to diesel fuel's inherent lubricity were reduced or eliminated. In response to these developments, a number of effective lubricity additives were developed for diesel fuels. These additives are now widely used to enhance the lubricity of highly refined, low sulfur diesel fuels.

In certain types of in-line diesel injection pumps, engine oil contacts diesel fuel. Engine oil may also come into contact with the diesel fuel through direct addition of used engine oil to the fuel. Certain types of lubricity additives used in low sulfur diesel fuel have been found to contribute to fuel filter blockage and to pump plunger sticking. Lubricity additives having poor compatibility with engine oil have been shown to cause these problems. Compatibility is defined as the tendency for the diesel fuel containing the lubricity additive not to form fuel insoluble deposits, gels or heavy sticky residues when in contact with engine oil. These deposits, gels or residues have been shown to cause fuel filter blockage and injection pump sticking. The additives of the present invention are compatible with engine oil.

Gasoline fuels are also becoming subject to compositional constraints, including restrictions on sulfur content, in an effort to reduce pollutants. The principal concern is the effect of sulfur on exhaust catalyst life and performance. The lubricity requirements of gasoline are somewhat lower than for diesel fuel since the majority of gasoline fuel injection systems inject fuel upstream of the inlet valves and thus operate at much lower pressures than diesel fuel pumps. However, as automobile manufacturers desire to have electrically powered fuel pumps within the fuel tanks, failure of the pumps can be expensive to repair. These problems are also likely to increase as injection systems become more sophisticated and the gasoline fuels become more highly refined.

Additional pump wear concerns have arisen with the introduction of vehicles having direct injection gasoline (DIG) engines since the fuel pumps for these vehicles operate at significantly higher pressures than traditional gasoline fuel pumps.

Another area subject to pump wear and failure is the use of submerged fuel pumps in gasoline or diesel fuel storage tanks. It is important to reduce the wear of these submerged pumps due to the difficulty of accessing these pumps for repair and maintenance.

Many commercially available gasoline fuels contain gasoline detergents such as polyisobutylene amine and polyether amine. These compounds are known to have a minor effect on the wear properties of the fuel. A growing number of commercially available gasoline fuels contain oxygenates, such as methyltertiarybutylether (MTBE). These oxygenates are known to increase rates of wear of fuel pump components as they have very high friction coefficients. In light of the desire for more highly refined fuels, lower sulfur content and oxygenation of the fuels, there is presently a need for lubricity improvers for hydrocarbon fuels in order to obtain acceptable fuel pump life. The present invention addresses these problems by adding the novel Mannich reaction products to the fuel.

While the prior art is replete with numerous treatments for fuels, it does not disclose the addition of the present additives to hydrocarbon fuels or teach their use for providing enhanced detergency and lubricity to said fuels.

SUMMARY OF THE INVENTION

The present invention relates to the treatment of a hydrocarbon fuel to substantially reduce the wear occasioned upon fuel pumps used to pump said hydrocarbon fuels and to provide effective detergency to the fuels without attendant deterioration in engine performance. The present invention also relates to the discovery that the addition to a fuel of the reaction products of the present invention will improve detergency and lubricity as compared to a similar fuel that has not been treated with said reaction products.

Thus, there is disclosed a fuel composition comprising a major amount of a hydrocarbon fuel and a minor amount of a fuel-soluble dispersant obtained by reacting i) a compound containing at least one primary or secondary amine group and at least one hydroxyl group; ii) a polyamine containing at least two amine groups wherein at least one of the amine groups is a primary or secondary amine, and wherein component ii) is different from i); iii) an alkyl-substituted hydroxyaromatic compound; and iv) an aldehyde. The dispersant additives are preferably present in the fuel in an amount within the range of from about 1 to about 1000 parts by weight of additive per million parts by weight of fuel (ppm w/w). More preferably, the dispersants are present in the fuel in an amount within the range from about 10 to about 500 ppm w/w, most preferably, from about 30 to about 300 ppm w/w.

There is also disclosed a method for reducing the wear of fuel pumps through which a hydrocarbon fuel is pumped, comprising adding a fuel-soluble additive to said fuel wherein the fuel-soluble additive comprises the above-described dispersant and wherein the dispersant additive is added to the fuel in an amount effective to improve the detergency and lubricity of the fuel, typically, the dispersant additive is present in the fuel composition in an amount of at least 1 ppm.

In view of the problems discussed above, a general aspect of the present invention is to provide a fuel additive that gives improved detergency to the fuel and protects the fuel pump from excessive wear and breakdown. A further aspect of the invention is to provide a fuel additive suitable for addition to a fuel that does not damage the fuel system and does not cause an increase in undesirable combustion products.

DETAILED DESCRIPTION OF THE INVENTION

The dispersant additives of the present invention may be categorized as Mannich reaction products and are fuel-soluble reaction products obtained by the reaction of i) a compound containing at least one primary or secondary amine group and at least one hydroxyl group; ii) a polyamine containing at least two amine groups wherein at least one of the amine groups is a primary or secondary amine, and wherein component ii) is different from i); iii) an alkyl-substituted hydroxyaromatic compound; and iv) an aldehyde.

Amines suitable for use as component i) contain at least one primary or secondary amine group and at least one hydroxyl group. The preferred amine reactants for use as component i) in the present invention are amino-alcohols; alkoxylated amines; and mixtures thereof. Examples of suitable amino-alcohols include ethanolamine and diethanolamine; representative alkoxylated amines include ethoxylated and propoxylated amines and polyamines. An example of these amines includes, for example, 2-(2-aminoethylamino) ethanol. A particularly preferred amine for use as component i) is diethanolamine.

Polyamines suitable for use as component ii) contain at least two amine groups wherein at least one of the amine groups is a primary or secondary amine, and wherein component ii) is different from i).

Representative amine reactants useful as component ii) include, but are not limited to, alkylene polyamines having at least one suitably reactive primary or secondary amino group in the molecule. Other substituents may be present in the polyamine. In a preferred embodiment, the alkylene polyamine is a polyethylene polyamine. Suitable alkylene polyamine reactants include ethylenediamine, diethylenetriamine, triethylenetetramine, tetraethylenepentamine, pentaethylenehexamine, hexaethyleneheptamine, heptaethylene octamine, octaethylenenonamine, nonaethylenedecamine, decaethyleneundecamine and mixtures of such amines having nitrogen contents corresponding to alkylene polyamines of the formula $H_2N-(A-NH-)_nH$, where A is divalent ethylene or propylene and n is an integer of from 1 to 10. The alkylene polyamines may be obtained by the reaction of ammonia and dihalo alkanes, such as dichloro alkanes. Thus, the alkylene polyamines obtained from the reaction of 2 to 11 moles of ammonia with 1 to 10 moles of dichloro alkanes having 2 to 6 carbon atoms and the chlorines on different carbon atoms are suitable alkylene polyamine reactants.

In another preferred embodiment of the present invention, the amine useful as component ii) is a polyamine having at least one primary or secondary amino group and at least one tertiary amino group in the molecule. Examples of suitable polyamines include N,N,N",N"-tetraalkyldialkylenetriamines (two terminal tertiary amino groups and one central secondary amino group), N,N,N',N"-tetraalkyltrialkylenetetramines (one terminal tertiary amino group, two internal tertiary amino groups and one terminal primary amino group), N,N,N',N",N"'-pentaalkyltrialkylenetetramines (one terminal tertiary amino group, two internal tertiary amino groups and one terminal secondary amino group), tris(dialkylaminoalkyl) aminoalkylmethanes (three terminal tertiary amino groups and one terminal primary amino group), and like compounds, wherein the alkyl groups are the same or different and typically contain no more than about 12 carbon atoms each, and which preferably contain from 1 to 4 carbon atoms each. Most preferably these alkyl groups are methyl and/or ethyl groups. Preferred polyamine reactants include N,N-dimethyl-1,3-propanediamine and N-methyl piperazine.

The alkyl-substituted hydroxyaromatic compounds and aldehydes used in making the Mannich detergents of the present invention may be any such compounds known and applied in the art, in accordance with the foregoing limitations.

Representative alkyl-substituted hydroxyaromatic compounds that may be used in forming the present Mannich products are polypropylphenol (formed by alkylating phenol with polypropylene), polybutylphenols (formed by alkylating phenol with polybutenes and/or polyisobutylene), and polybutyl-co-polypropylphenols (formed by alkylating phenol with a copolymer of butylene and/or butylene and propylene). Other similar long-chain alkylphenols may also be used. Examples include phenols alkylated with copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the alkyl-substituted hydroxyaromatic compounds are substantially aliphatic hydrocarbon polymers.

Polybutylphenol (formed by alkylating phenol with polybutylene) is preferred. Unless otherwise specified herein, the term "polybutylene" is used in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins. So-called high reactivity polybutylenes having relatively high proportions of polymer molecules having a terminal vinylidene group, formed by methods such as described, for example, in U.S. Pat. No. 4,152,499 and W. German Offenlegungsschrift 29 04 314, are also suitable for use in forming the long chain alkylated phenol reactant.

The alkylation of the hydroxyaromatic compound is typically performed in the presence of an alkylating catalyst at a temperature in the range of about 50 to about 200° C. Acidic catalysts are generally used to promote Friedel-Crafts alkylation. Typical catalysts used in commercial production include sulphuric acid, $BF_3$, aluminum phenoxide, methanesulphonic acid, cationic exchange resin, acidic clays and modified zeolites.

The long chain alkyl substituents on the benzene ring of the phenolic compound are derived from polyolefin having a number average molecular weight ($M_n$) of from about 500 to about 3000 (preferably from about 500 to about 2100) as determined by gel permeation chromatography (GPC). It is also preferred that the polyolefin used have a polydispersity (weight average molecular weight/number average molecular weight) in the range of about 1 to about 4 (preferably from about 1 to about 2) as determined by GPC.

The chromatographic conditions for the GPC method referred to throughout the specification are as follows: 20 $\mu L$ of sample having a concentration of approximately 5 mg/mL (polymer/unstabilized tetrahydrofuran solvent) is injected into 1000A, 500A and 100A columns at a flow rate of 1.0 mL/min. The run time is 40 minutes. A Differential Refractive Index detector is used and calibration is relative to polyisobutene standards having a molecular weight range of 284 to 4080 Daltons.

The Mannich dispersant may be, and preferably is, made from a long chain alkylphenol. However, other phenolic compounds may be used including high molecular weight alkyl-substituted derivatives of resorcinol, hydroquinone, catechol, hydroxydiphenyl, benzylphenol, phenethylphenol, naphthol, tolylnaphthol, among others. Preferred for the preparation of the Mannich condensation products are the polyalkylphenol reactants, e.g., polypropylphenol and polybutylphenol whose alkyl group has a number average molecular weight of about 500 to about 2100, while the most preferred alkyl group is a polybutyl group derived from polybutylene having a number average molecular weight in the range of about 800 to about 1300.

The preferred configuration of the alkyl-substituted hydroxyaromatic compound is that of a para-substituted mono-alkylphenol. However, any alkylphenol readily reactive in the Mannich condensation reaction may be employed. The long chain alkyl substituents may contain some residual unsaturation, but in general, are substantially saturated alkyl groups.

Representative aldehydes for use in the preparation of the detergent additives include the aliphatic aldehydes such as formaldehyde, acetaldehyde, propionaldehyde, butyraldehyde, valeraldehyde, caproaldehyde, heptaldehyde, stearaldehyde. Aromatic aldehydes which may be used include benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde or formalin.

Components i), ii), iii) and iv) are reacted under suitable Mannich reaction conditions to form a Mannich condensation reaction product.

The condensation reaction among the alkyl-substituted hydroxyaromatic compound, the amines and the aldehyde may be conducted at a temperature in the range of about 40° to about 200° C. The reaction can be conducted in bulk (no diluent or solvent) or in a solvent or diluent. Water is evolved and can be removed by azeotropic distillation during the course of the reaction. Typically, the Mannich additives are formed by reacting the alkyl-substituted hydroxyaromatic compound, the compound containing at least one primary or secondary amine group and at least one hydroxyl group, polyamine and aldehyde in the molar ratio of 1.0:0.2–1.8:0.2–1.8:1.0–4.0, respectively, preferably 1:0.5–1.5:0.5–1.5:1.5–2.5. The aldehyde is typically present in a molar amount at least equal to the total molar amount of the amine compounds present.

Although the novel reaction products of the present invention may be formed by reacting a mixture of amines (i) and (ii) with the hydroxyaromatic compound and an aldehyde, it is preferred, although not required, to 1) react the hydroxyaromatic compound with either amine (i) or amine (ii) and an aldehyde, and 2) react the reaction product of 1) with the other amine, either (ii) or (i) whichever was not used in step 1, and an aldehyde.

Thus one embodiment of the present invention comprises a process for preparing Mannich reaction products comprising:

1) reacting an alkyl-substituted hydroxyaromatic compound (iii), an aldehyde (iv) and a compound containing at least one primary or secondary amine group and at least one hydroxyl group (i); and
2) reacting the product formed in 1) with an aldehyde (iv) and a polyamine containing at least two amine groups wherein at least one of the amine groups is a primary or secondary amine (ii), and wherein component ii) is different from component i).

In step 1) of the above process components iii), iv) and i) are preferably present in the molar ratio of 1.0:0.2–3.6:0.2–1.8, respectively. In step 2), components iv) and ii) are preferably present in an amount of 0.2–3.6 moles of iv) and 0.2–1.8 moles of ii) per mole of alkyl-substituted hydroxyaromatic compound used in step 1).

Another embodiment of the present invention comprises a process for preparing Mannich reaction products comprising:

1) reacting an alkyl-substituted hydroxyaromatic compound (iii), an aldehyde (iv) and a polyamine containing at least two amine groups wherein at least one of the amine groups is a primary or secondary amine (ii); and
2) reacting the product formed in 1) with an aldehyde (iv) and a compound containing at least one primary or secondary amine group and at least one hydroxyl group (i), and wherein component i) is different from component ii).

In step 1) of the above process components iii), iv) and ii) are preferably present in the molar ratio of 1.0:0.2–3.6:0.2–1.8, respectively. In step 2), components iv) and i) are preferably present in an amount of 0.2–3.6 moles of iv) and 0.2–1.8 moles of i) per mole of alkyl-substituted hydroxyaromatic compound used in step 1).

When formulating the fuel compositions of this invention, the dispersant additives (with or without other additives) are employed in an amount effective to improve the detergency of the fuel. Generally speaking the fuels of this invention will contain, on an active ingredient basis, an amount of dispersant additive in the range of about 1 to about 1000 parts by weight of additive per million parts by weight of fuel.

An advantage of the present invention is that the additive reaction products do not detrimentally impact the combustion properties of the fuel. Further, the reaction products of the present invention can contribute lubricity benefits to the formulated fuel compositions. The improvements in the fuels lubricity will allow formulation with less, or even no, additional lubricity additive. Further, the improved fuel lubricity can reduce fuel pump wear.

The fuel compositions of the present invention may contain supplemental additives in addition to the reaction products described above. Said supplemental additives include supplemental dispersant/detergents, octane improvers, cetane improvers, antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives and combustion improvers.

Cyclopentadienyl manganese tricarbonyl compounds such as methylcyclopentadienyl manganese tricarbonyl are preferred combustion improvers because of their outstanding ability to reduce tailpipe emissions such as NOx and smog forming precursors and to significantly improve the octane quality of gasolines, both of the conventional variety and of the "reformulated" types.

The base fuels used in formulating the fuel compositions of the present invention include any base fuels suitable for use in the operation of spark-ignition or compression-ignition internal combustion engines such as diesel fuel, jet fuel, kerosene, leaded or unleaded motor and aviation gasolines, and so-called reformulated gasolines which typically contain both hydrocarbons of the gasoline boiling range and fuel-soluble oxygenated blending agents, such as alcohols, ethers and other suitable oxygen-containing organic compounds. Oxygenates suitable for use in the present invention include methanol, ethanol, isopropanol, t-butanol, mixed C1 to C5 alcohols, methyl tertiary butyl ether, tertiary amyl methyl ether, ethyl tertiary butyl ether and mixed ethers. Oxygenates, when used, will normally be present in the base fuel in an amount below about 25% by volume, and preferably in an amount that provides an oxygen content in the overall fuel in the range of about 0.5 to about 5 percent by volume.

Any middle-distillate fuel may be used in the present invention, however, high-sulfur content fuels typically do not require additional lubricity additives. In a preferred embodiment, the middle-distillate fuel is a diesel fuel having a sulfur content of up to about 0.2% by weight, more preferably up to about 0.05% by weight, as determined by the test method specified in ASTM D 2622-98.

The additives used in formulating the preferred fuels of the present invention can be blended into the base fuel individually or in various sub-combinations. However, it is preferable to blend all of the components concurrently using an additive concentrate (i.e., additives plus a diluent, such as a hydrocarbon solvent). The use of an additive concentrate takes advantage of the mutual compatibility afforded by the combination of ingredients when in the form of an additive concentrate. Also, the use of a concentrate reduces blending time and lessens the possibility of blending errors.

The examples given below illustrate the novel fuel compositions of the present invention. Unless otherwise specified, all proportions are given by weight. The following examples are not intended or should not be construed as limitations of the invention as presently claimed.

EXAMPLE I

The dispersants were prepared as follows: Dispersants A, B and C were prepared by reacting components (i) and (ii), set forth below, with a polyisobutenyl-substituted phenol and formaldehyde. The molar proportions of amine (i):phenol:formaldehyde in dispersant A were 1:1:1. The molar proportions of amine (i):amine (ii):phenol:formaldehyde in dispersants B and C were 1:1:1:2. Dispersants B and C were prepared by 1) reacting amine i), formaldehyde and the phenol at a molar ratio of 1:1:1, and 2) reacting the product of 1) with amine ii) and formaldehyde at a molar ratio of 1:1:1. The reactions were conducted in xylene at 145° C.

Dispersant A: Component i) was diethanolamine; and no component ii) was used.

Dispersant B: Component i) was diethanolamine; and component ii) was N,N-dimethyl-1,3-propanediamine.

Dispersant C: Component i) was diethanolamine; and component ii) was N-methyl piperazine.

The efficacy of the detergent/lubricity additives of the present invention was assessed using the Scuffing Load BOCLE (ball-on-cylinder lubricity evaluator) test (ASTM D 6078-97). The Scuffing Load BOCLE test allows discrimination and ranking of fuels of differing lubricity. The Scuffing test simulates the severe modes of wear failure encountered in fuel pumps and therefore provides results which are representative of how the fuel would behave in service. The load at which wear failure occurs is referred to as the scuffing load and is a measure of the inherent lubricity of the fuel. The scuffing load is primarily identified by the size and appearance of the wear scar on the ball, which is considerably different in appearance to that found under milder non-scuffing conditions. Fuels giving a high scuffing load on failure have better lubricating properties than fuels giving a low scuffing load on failure. All Scuffing Load BOCLE tests were conducted in a Jet A fuel containing 115 ppm w/w of the dispersant.

The only diesel detergency test that has met any degree of acceptance in the U.S. is the Cummins L10 test. A low sulfur No. 2D diesel fuel was used for the L10 testing. The fuel containing 130 ppm w/w of a candidate additive is run in a Cummins L10 engine for 125 hours. At the end of the test, the injectors are removed and evaluated for plunger appearance. A trained rater inspects the plunger visually and assigns demerits following a Coordinating Research Council (CRC) protocol. CRC ratings for the six injectors are then averaged to give the test result. Lower CRC ratings indicate improved dispersancy/detergency.

TABLE 1

| Dispersant | SLBOCLE Load (g) | Average CRC Rating |
| --- | --- | --- |
| Base fuel only* | 1600 | 26.7[1] |
| A* | 3000 | 27.6 |
| B | 2600 | 10.3 |
| C | 2800 | 18.5 |

*Comparative Examples not within the scope of the present invention
[1]Average of 3 runs It is clear, upon examination of the data in Table 1, that the fuel compositions containing the additives of the present invention exhibit both improved lubricity and improved detergency as compared to base fuel alone or Mannich dispersants containing only the amine of component i).

As natural lubricity of gasoline is on a noticeable decline since refining has become more severe in order to produce "low emissions gasolines", a fuel additive is required by the industry to ensure that fuel pumps will accomplish an acceptable working lifetime. Although diesel fuel pumps and injectors operate under more stringent conditions than gasoline fuel pumps (15,000 to 30,000 psi vs. 40–60 psi for gasoline engines), there is a trend in the automotive industry to increase fuel system pressures, such as in the case of DIG engines (1000 to 2000 psi), and thus the demands made upon gasoline fuel pumps will increase.

In certain regions of the United States such as California, "low emission", highly oxygenated gasoline blends will put further abrasive demands upon fuel pumps. Gasoline fuel pump failures will continue to increase and therefore the industry is presently searching for an additive that will overcome this problem. The automotive industry is thus in need of a lubricity agent for fuels as they become harsher as a result of increased refining to achieve lower emissions. Further, commercialization of gasoline direct injection technology equipped vehicles with gasoline fuel pumps operating at much higher injection pressures will require careful consideration of gasoline lubricity properties. Thus, the present invention addresses these needs in an efficient and economical manner.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as formation of the lubricity additive reaction products) or in forming a desired composition (such as an additive concentrate or additized fuel blend). It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" means that the substance under discussion should be sufficiently soluble at 20° C. in the base fuel selected for use to reach at least the minimum concentration required to enable the substance to serve its intended function. Preferably, the substance will have a substantially greater solubility in the base fuel than this. However, the substance need not dissolve in the base fuel in all proportions.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Patentee does not intend to dedicate any disclosed embodiments to the public, and to the extent any disclosed modifications or alterations may not literally fall within the scope of the claims, they are considered to be part of the invention under the doctrine of equivalents.

What is claimed is:

1. A composition of matter obtained by reacting:
   (i) a compound selected from the group consisting of ethanolamine and diethanolamine;
   (ii) a polyamine containing at least two amine groups wherein at least one of the amine groups is a primary or secondary amine;
   (iii) an alkyl-substituted hydroxyaromatic compound; and
   (iv) at least one aldehyde.

2. The composition of claim 1 obtained by reacting the alkyl-substituted hydroxyaromatic compound (component iii), the compound selected from the group consisting of ethanolamine and diethanolamine (component i), the polyamine containing at least two amine groups wherein at least one of the amine groups is a primary or secondary amine (component ii), and an aldehyde (component iv) in the molar ratio of 1.0:0.2–1.8:0.2–1.8:1.0–4.0, respectively.

3. The composition of claim 1 wherein said compound selected from the group consisting of ethanolamine and diethanolamine (component i) comprises diethanolamine.

4. The composition of claim 1 wherein said polyamine containing at least two amine groups wherein at least one of the amine groups is a primary or secondary amine (component ii) comprises an alkylene polyamine.

5. The composition of claim 1 wherein said polyamine containing at least two amine groups wherein at least one of the amine groups is a primary or secondary amine (component ii) comprises N,N-dimethyl-1,3-propanediamine.

6. The composition of claim 1 wherein said polyamine containing at least two amine groups wherein at least one of the amine groups is a primary or secondary amine (component ii) comprises N-methyl piperazine.

7. The composition of claim 1 wherein said alkyl-substituted hydroxyaromatic compound (component iii) comprises an alkyl-substituted phenol.

8. The composition of claim 7 wherein said alkyl-substituted phenol comprises polybutylphenol.

9. A fuel composition comprising:
(a) a major proportion of a liquid hydrocarbon fuel; and
(b) a dispersant additive, wherein said dispersant additive is obtained by reacting:
  (i) a compound selected from the group consisting of ethanolamine and diethanolamine;
  (ii) a polyamine containing at least two amine groups wherein at least one of the amine groups is a primary or secondary amine;
  (iii) an alkyl-substituted hydroxyaromatic compound; and
  (iv) at least one aldehyde.

10. The fuel composition of claim 9 wherein said dispersant is present in the fuel composition in an amount within the range of from about 1 to about 1000 parts of additive by weight per million parts by weight of fuel.

11. The fuel composition of claim 10 wherein said dispersant is present in an amount within the range of from about 10 to about 500 parts of additive by weight per million parts by weight of fuel.

12. The fuel composition of claim 11 wherein said dispersant is present in an amount within the range of from about 30 to about 300 parts of additive by weight per million parts by weight of fuel.

13. The fuel composition of claim 9 wherein said dispersant additives are formed by reacting the alkyl-substituted hydroxyaromatic compound (component iii), the compound selected from the group consisting of ethanolamine and diethanolamine (component i), the polyamine containing at least two amine groups wherein at least one of the amine groups is a primary or secondary amine (component ii), and an aldehyde (component iv) in the molar ratio of 1.0:0.2–1.8:0.2–1.8:1.0–4.0, respectively.

14. The fuel composition of claim 9 wherein said compound selected from the group consisting of ethanolamine and diethanolamine(component i) comprises diethanolamine.

15. The fuel composition of claim 9 wherein said polyamine containing at least two amine groups wherein at least one of the amine groups is a primary or secondary amine (component ii) comprises an alkylene polyamine.

16. The fuel composition of claim 9 wherein said polyamine containing at least two amine groups wherein at least one of the amine groups is a primary or secondary amine (component ii) comprises N,N-dimethyl-1,3-propanediamine.

17. The fuel composition of claim 9 wherein said polyamine containing at least two amine groups wherein at least one of the amine groups is a primary or secondary amine (component ii) comprises N-methyl piperazine.

18. The fuel composition of claim 9 wherein said alkyl-substituted hydroxyaromatic compound (component iii) comprises an alkyl-substituted phenol.

19. The fuel composition of claim 18 wherein said alkyl-substituted phenol comprises polybutylphenol.

20. A fuel composition according to claim 9 wherein said liquid hydrocarbon fuel comprises a compression-ignition fuel selected from the group consisting of diesel, biodiesel, jet fuel and kerosene.

21. A fuel composition according to claim 20 wherein said compression-ignition fuel has a sulfur content below 0.2% by weight.

22. A fuel composition according to claim 9 wherein said liquid hydrocarbon fuel comprises a spark-ignition fuel selected from the group consisting of gasoline and reformulated gasolines.

23. A fuel composition according to claim 9 wherein said fuel composition further comprises at least one additive selected from the group consisting of supplemental dispersants/detergents, octane improvers, cetane improvers, carrier fluids, demulsifiers, antioxidants, antifoam agents, anti-icing additives, biocides, combustion improvers, alkali or alkaline-earth metal detergents, drag reducers, metal deactivators, lubricity additives, dyes, markers, odor masks, odorants and stability improvers.

24. A method of minimizing or reducing deposits in a compression-ignition internal combustion engine, said method comprises providing as fuel for the operation of said engine a fuel in accordance with claim 20.

25. A method of minimizing or reducing deposits in a spark-ignition internal combustion engine, said method comprises providing as fuel for the operation of said engine the fuel in accordance with claim 22.

26. A process for preparing Mannich reaction products comprising:
  1) reacting an alkyl-substituted hydroxyaromatic compound (iii), an aldehyde (iv) and a compound selected from the group consisting of ethanolamine and diethanolamine (i); and
  2) reacting the product formed in 1) with an aldehyde (iv) and a polyamine containing at least two amine groups wherein at least one of the amine groups is a primary or secondary amine (ii).

27. The process for preparing the Mannich reaction products of claim 26 wherein in 1) components iii), iv) and i) are present in the molar ratio of 1.0:0.2–3.6:0.2–1.8, respectively and wherein in step 2) components iv) and ii) are present in an amount of 0.2–3.6 moles of iv) and 0.2–1.8 moles of ii) per mole of alkyl-substituted hydroxyaromatic compound used in step 1).

28. A process for preparing Mannich reaction products comprising:
  1) reacting an alkyl-substituted hydroxyaromatic compound (iii), an aldehyde (iv) and a polyamine containing at least two amine groups wherein at least one of the amine groups is a primary or secondary amine (ii); and
  2) reacting the product formed in 1) with an aldehyde (iv) and a compound selected from the group consisting of ethanolamine and diethanolamine (i).

29. The process for preparing the Mannich reaction products of claim 20 wherein in 1) components iii), iv) and ii) are present in the molar ratio of 1.0:0.2–3.6:0.2–1.8, respectively and wherein in step 2) components iv) and i) are present in an amount of 0.2–3.6 moles of iv) and 0.2–1.8 moles of i) per mole of alkyl-substituted hydroxyaromatic compound used in step 1).

* * * * *